Jan. 20, 1959  C. W. CHESTER  2,869,922
SUN SHIELD FOR AUTOMOBILES

Filed Oct. 5, 1956  2 Sheets-Sheet 1

CARROLL W. CHESTER,
INVENTOR.

By Barkelew + Lewis

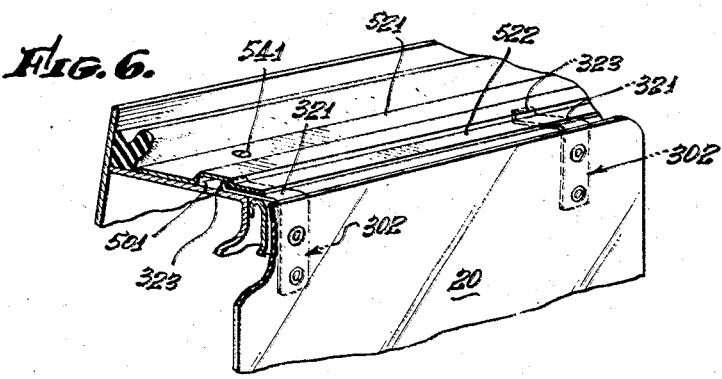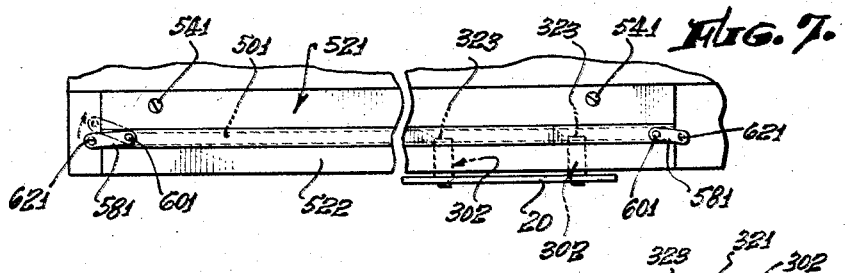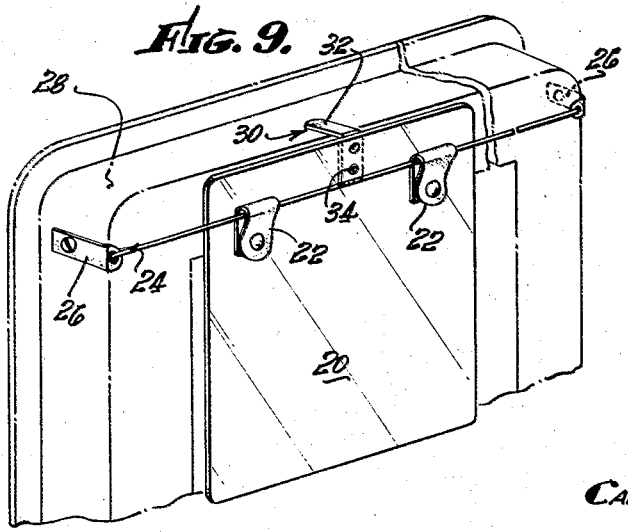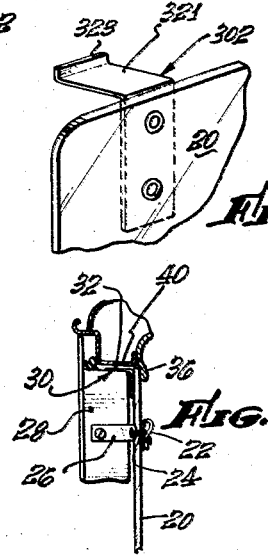

United States Patent Office 2,869,922
Patented Jan. 20, 1959

2,869,922

SUN SHIELD FOR AUTOMOBILES

Carroll W. Chester, Los Angeles, Calif.

Application October 5, 1956, Serial No. 614,233

10 Claims. (Cl. 296—97)

This invention relates to sun shields of the type adapted to protect an automobile driver's, or occupant's, face and eyes from the sun shining in at the side.

In my co-pending application Ser. No. 584,106 filed May 10, 1956, now Patent No. 2,831,725, issued April 22, 1956, I have shown and described a simple form of sun shield adapted to be attached in a simple manner to existing automobiles and adjustable in longitudinal position so as to fully protect the face but at the same time to impede the view to the side a minimum. While the simple form of shield mounting shown in that application is fully effective in its shielding functions, I have found it apt to be wind blown and fluttered distractingly under certain wind conditions when the glass in the door, to which the shield is attached, is lowered.

The general objects of the present invention are, among other things, to provide improved forms of shield mountings that overcome that occasional difficulty and also to provide such mountings in forms adapted for original manufacturing application to automobiles.

The present improvement invention will be best understood from the following descriptions of typical and illustrative embodiments, reference for that purpose being had to the accompanying drawings, in which:

Fig. 6 is a fragmentary perspective showing another form of my improved mounting;

Fig. 7 is a plan of the same;

Fig. 8 is a detail perspective;

Fig. 9 is a fragmentary perspective showing another form of my improved mounting; and Fig. 10 is a detail section showing the last form.

Figure 1:
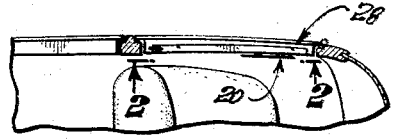
Fig. 1 is a schematic plan-section showing the application of my sun shield to a side door.

Figs. 9 and 10 illustrate a simple form of my present improvement applied to the shield mounting of my said prior application. In the form shown in that application the shield 20, in the form of a sheet of tinted transparent plastic, is hung, by clips such as shown at 22, on a wire, cord or small cable 24 stretched taut, between attachment members 26, across the inner face of the door frame 28 near its top. The shield is slidable fore and aft on the cord 24 to adjust its position.

To stabilize and support that shield I now attach to its top a stabilizer and auxiliary carrier 30 in the form of an angle piece having a horizontal part 32 which projects over and rests on the inner upper edge of the door frame. The angle piece is rigidly attached to the shield, as by riveting as indicated at 34. When the door is closed the upper edge of the shield, which extends substantially to the top of the door frame, and the vertical part of the angle piece, are held between the door frame and the inner sealing lip 36 that customarily surrounds the inner side of the door opening. And at the same time the horizontal part 32 is held, closely but slidably, between the upper edge of the door frame and the framing 40 of the door opening. See Fig. 10.

That simple arrangement stabilizes the shield which is composed of fairly stiff sheet material, and prevents its being fluttered in the wind when the door glass is lowered. The carrier 30 positively supports the shield, and, when held between the closed door and its frame, also stabilizes it. The flexible member 24 forms a longitudinal guide for the shield and bracket, holds the shield and bracket 30 against or toward the inside face of the door, holds bracket 30 down and outward over the upper edge of the door, stabilizing the shield, and holding it in place against the door when the door is opened. And, like the form of my prior application, the whole shield device as here shown, is easily attachable to any existing automobile, necessitating only the attachment of the attaching members 26 to the door frame and stretching the cord or other element 24 between them.

Figs. 2 to 8 show other improved forms in which a member or members like the rigid carried piece 30 become the sole immediate support of the shield, dispensing with the supporting cord 24. The form of Figs. 2 to 5 is particularly adapted to original manufacturing, while that of Figs. 6 to 8 is adapted either for original manufacturing or subsequent attachment.

In Figs. 2–5 the shield 20 has at its upper edge a pair of rigidly attached carriers in the form of angle pieces 301. The horizontal parts 321 of these carriers overhang the upper inner edge of door frame 28 and depending projections 322 at their ends project down into a longitudinal groove 50 formed in the upper edge of the door frame. A thin cover plate 52, secured at 54 to the door frame, extends over the carrier parts 321 to hold them down to keep their projections 322 in the groove 50. Cover plate 52 does not press down on the parts 321 with any appreciable force, so that parts 321, and with them the shield 20, are easily slidable longitudinally to any selected longitudinal position on the door. As shown in the drawings, and particularly in Fig. 4, freedom of 321 from frictional binding under plate 52 is had, for instance, by somewhat lowering the portion of the upper door framing that lies inwardly of the groove 50. This is indicated at 281 in Fig. 4. With the shield so mounted it is held rigidly in place by the structure described, and also by having its upper edge held between the door frame and lip 36 when the door is closed.

To prevent accidental removal of the shield from the door by excessive longitudinal movement when the door is open, some kind of stop arrangement is provided at or near the ends of groove 50. These stops can be permanent, in which case the shield can be removed from the door by removing plate 52. It is preferred however to provide means for easily removing and installing the shield, and that is done by providing a movable stop near one end of groove 50, the other end having a permanent stop as shown at 56 formed by the stopped end of the groove under or near the end of cover plate 52.

Figure 2:
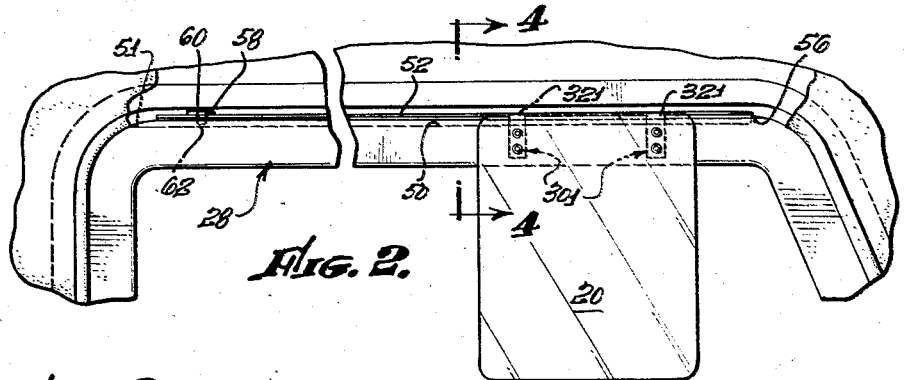
Fig. 2 is an enlarged interior elevation.
Figure 3:
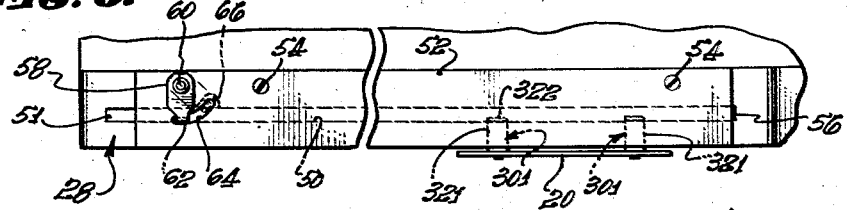
Fig. 3 is a plan view of the top of the door equipped with my shield and showing one form of my improved mounting.
Figure 5:
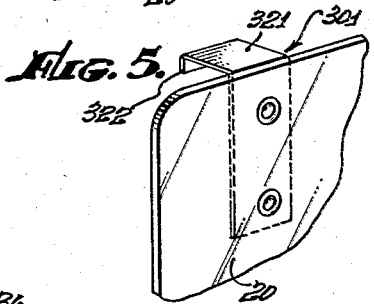
Fig. 5 is a detail perspective.
Figure 4:
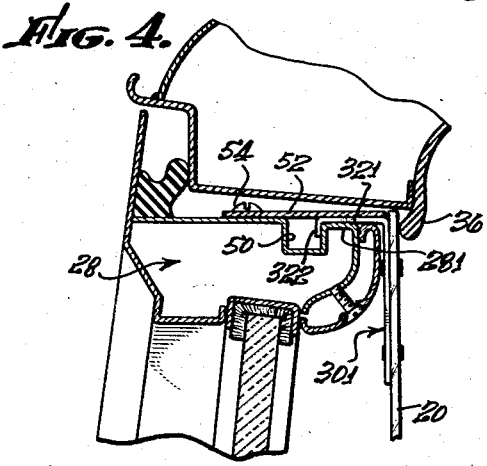
Fig. 4 is an enlarged section on line 4—4 of Fig. 2.

A preferred form of removable stop, as shown in Figs. 2 and 3, may comprise simply a stop piece 58 pivoted at 60 on cover plate 52 and having at its outer end a stop pin 62 which depends through a slot 64 in the plate. In the operative stop position pin 62 depends into groove 50. In its inoperative position (dotted lines in Fig. 3) the pin clears the groove by being swung into a recess 66 at the side of the groove. In the latter position, shield carriers 301 can be slid out of the then open end 51 of the groove.

In Figs. 6 to 8, the general arrangement is similar to that of Figs. 2 to 5, but here the groove corresponding to groove 50 of Figs. 2 to 5 is formed in a cover plate attachable to the door frame; necessitating no changes in the door frame itself.

In Figs. 6 to 8, the angle carriers 302 have upstanding projections 323 at the ends of their horizontal parts 321. Cover plate 521, secured at 541 to the upper door edge face has an upwardly recessed groove 501 formed in it. The part 522 of the plate that lies inward of groove 501 is spaced above the plane of the secured part of the plate, so that the horizontal parts 321 of the carriers are held slidably under 522. In that position the upward projections 323 project upwardly into groove 501. The shield is supported and held in place in the same manner that it is in Figs. 2 to 5, that description needing no repetition.

In Fig. 7, the stop arrangement at the groove ends may be the same as in Figs. 2 and 3. I have indicated, however, in Fig. 7, two removable stops which may be essentially the same as those shown in Figs. 2 and 3. As shown specifically in Fig. 7, the swingable stop arms 581 may be pivoted at 601 on plate 521. A dependent stop pin 621 may simply stand across the end of groove 501 in operative position and be swung away from that position to clear the groove end.

The general functions of the mounting and supporting means of Figs. 2 to 5 and 6 to 8 are the same as those of Figs. 9 and 10. In all forms the shield is supported on the upper edge of the door by the horizontal overhanging part of the bracket. In Figs. 9 and 10 the shield and bracket are held down and outwardly by the longitudinal guide cord 24; in Figs. 2 to 5 and 6 to 8, by the longitudinal guide formed by cover plate and the bracket projection 322 or 323 engaging in the groove. In all forms that means of holding the shield and bracket down and out extends longitudinally of the upper stile of the door, and the shield and bracket are longitudinally slidable on it.

I claim:

1. A sun shield for automobiles or the like, adapted to be applied to a glassed door, and comprising a shield piece of less width than the glassed opening of the door, and means for suspending the shield piece at, and holding it against, the inside face of the door, said means including a carrier rigidly attached to the upper part of the shield piece and having a horizontally extending portion adapted to extend outwardly over the inside upper edge of the door with its outer end inward of the outer upper edge of the door and to be held between the upper edge face of the door and the upper part of the door framing when the door is closed, with the shield piece depending from the carrier below the upper inner edge of the door, together with guide means holding the shield piece against the door and holding the horizontally extending portion of the carrier against the upper edge of the door and allowing horizontal sliding adjustment of the shield piece across the inner face of the door.

2. A sun shield as defined in claim 1 and in which the upper edge of the shield is substantially at the level of said horizontally extending carrier portion, so as to be substantially at the level of the upper edge of the door to be held between that upper edge and the usual sealing lip at the inside edge of the opening in the door framing.

3. A sun shield as defined in claim 2 and in which the shield holding means comprises a flexible member adapted to be stretched taut horizontally across the inner face of the door.

4. A sun shield as defined in claim 1 and in which the shield holding means comprises a flexible member adapted to be stretched taut horizontally across the inner face of the door.

5. In combination with a door of an automobile or the like having a glassed window, a sun shield of lesser width than the glassed window, and means for adjustably supporting the shield at the inner face of the door comprising a longitudinally extending groove formation at the upper edge face of the door, said groove formation having a depth dimension in a vertical direction, carrier means rigidly attached to the upper part of the shield and having a horizontally extending portion overhanging the upper edge of the door from its inside face with its outer end inward of the outer upper edge of the door, and a vertically extending projection on the horizontal portion projecting into the groove formation and longitudinally movable therein.

6. The combination defined in claim 5, in which the groove formation is in the upper edge face of the door.

7. The combination defined in claim 6 and also including a cover plate secured to the upper edge face of the door and overhanging said horizontally extending portion of the carrier means.

8. The combination defined in claim 5 and also including a cover plate secured along one edge to the upper edge face of the door, the opposite edge of the plate overhanging the horizontally extending part of the carrier means, and said groove formation being in said cover plate.

9. The combination defined in claim 5 and in which the upper edge of the shield is substantially at the level of said horizontally extending carrier portion, so as to be substantially at the level of the upper edge of the door to be held between that upper edge and the usual sealing lip at the inside edge of the opening in the door framing.

10. In combination with a door of an automobile or the like having a glassed window, a sun shield and carrier unit comprising a shield member of lesser width than the glassed window and a supporting bracket rigidly attached to the upper edge of the shield member and having at its upper end a horizontally extending portion projecting over the upper edge face of the door from the inner upper door edge, said horizontally extending portion of the supporting bracket having an outer end inward of the outer upper edge of the door, and guide means extending longitudinally of the upper door edge holding the unit against the door and holding the horizontally extending portion of the bracket against the upper edge face of the door and guiding the unit for movement longitudinally of the upper door edge.

References Cited in the file of this patent

UNITED STATES PATENTS

| | | |
|---|---|---|
| 1,273,934 | Horton | July 30, 1918 |
| 1,492,748 | Reimer | May 6, 1924 |
| 1,901,976 | Martin | Mar. 21, 1933 |
| 2,575,933 | Thorne | Nov. 20, 1951 |

FOREIGN PATENTS

| | | |
|---|---|---|
| 634,997 | France | Dec. 10, 1927 |